United States Patent
Breault, Jr.

(10) Patent No.: US 11,108,421 B1
(45) Date of Patent: Aug. 31, 2021

(54) SMART PHONE CARRYING ASSEMBLY

(71) Applicant: Edward Breault, Jr., Van Nuys, CA (US)

(72) Inventor: Edward Breault, Jr., Van Nuys, CA (US)

( * ) Notice: Subject to any disclaimer, the term of this patent is extended or adjusted under 35 U.S.C. 154(b) by 0 days.

(21) Appl. No.: 16/821,603

(22) Filed: Mar. 17, 2020

(51) Int. Cl.
| | |
|---|---|
| *H04B 1/3827* | (2015.01) |
| *A45C 11/00* | (2006.01) |
| *A45F 5/00* | (2006.01) |
| *H04B 1/3888* | (2015.01) |
| *H04M 1/725* | (2021.01) |

(52) U.S. Cl.
CPC .............. *H04B 1/385* (2013.01); *A45C 11/00* (2013.01); *A45F 5/00* (2013.01); *H04B 1/3888* (2013.01); *A45C 2011/002* (2013.01); *A45F 2005/006* (2013.01); *A45F 2200/0516* (2013.01); *H04M 1/725* (2013.01)

(58) Field of Classification Search
CPC ...................................................... H04B 1/385
See application file for complete search history.

(56) References Cited

U.S. PATENT DOCUMENTS

| | | | |
|---|---|---|---|
| 5,938,137 A | 8/1999 | Poulson | |
| 7,886,786 B1 * | 2/2011 | Christie | ................ A45C 11/18 150/108 |
| 9,154,591 B1 | 10/2015 | Patterson | |
| 9,521,896 B2 | 12/2016 | Peterson | |
| D802,572 S | 11/2017 | Harris | |
| 9,991,921 B1 | 6/2018 | Hodge | |
| 2005/0127123 A1 | 6/2005 | Smithers | |
| 2015/0102073 A1 | 4/2015 | Pusateri | |
| 2016/0131964 A1 * | 5/2016 | Basulto | ................ G03B 17/563 396/420 |

* cited by examiner

*Primary Examiner* — Hsinchun Liao

(57) ABSTRACT

A smart phone carrying assembly for suspending a smart phone from an article of clothing includes a shell that is positionable around a smart phone case. A plurality of engagements is each slidably coupled to the shell. Each of the engagements is independently positionable in an extended position having the engagements extending outwardly from the shell. In this way a respective one of engagements can be coupled to a suspension line for suspending the smart phone from an article of clothing. Additionally, each of the engagements is independently positionable in a retracted position having the engagements being recessed into the shell.

10 Claims, 6 Drawing Sheets

SMART PHONE CARRYING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to carrying devices and more particularly pertains to a new carrying device for suspending a smart phone from an article of clothing.

(2) Description of Related Art Including Information Disclosed Under 37 CFR 1.97 and 1.98

The prior art relates to carrying devices. The prior art discloses a case that has a ring thereon and a lanyard retractor that can be coupled to the ring for suspending the case from an article of clothing. The prior art also discloses a smart phone case that has a chain coupled thereto, forming a closed loop, for suspending from an article of clothing. The prior art discloses a variety of cord retractors that can each retractably engage a smart phone for suspending the smart phone from an article of clothing. In no case does the prior art disclose a shell that has retractable engagement points.

Brief Summary of the Invention

An embodiment of the disclosure meets the needs presented above by generally comprising a shell that is positionable around a smart phone case. A plurality of engagements is each slidably coupled to the shell. Each of the engagements is independently positionable in an extended position having the engagements extending outwardly from the shell. In this way a respective one of engagements can be coupled to a suspension line for suspending the smart phone from an article of clothing. Additionally, each of the engagements is independently positionable in a retracted position having the engagements being recessed into the shell.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
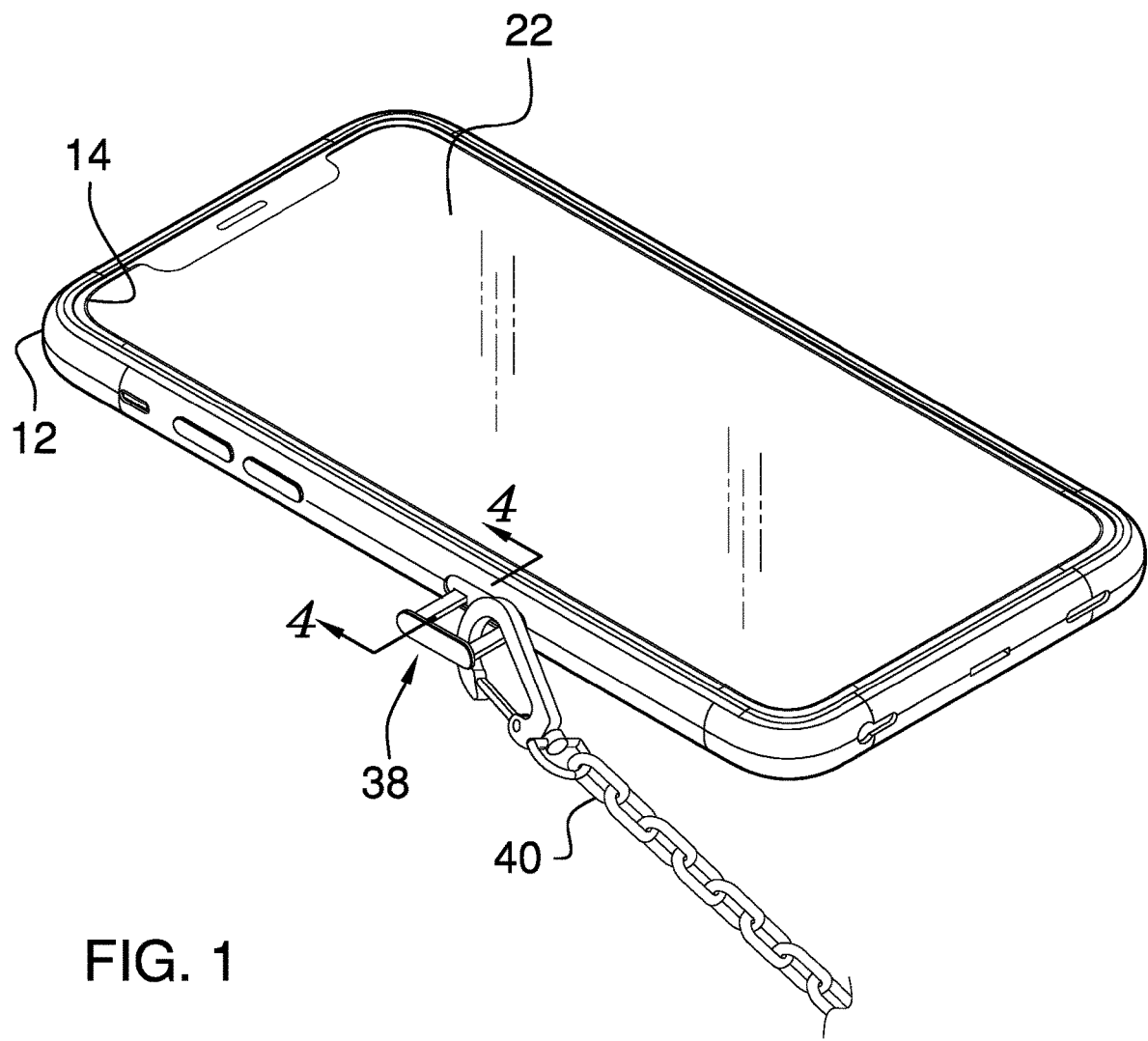
FIG. 1 is a perspective in-use view of a smart phone carrying assembly according to an embodiment of the disclosure.
Figure 2:
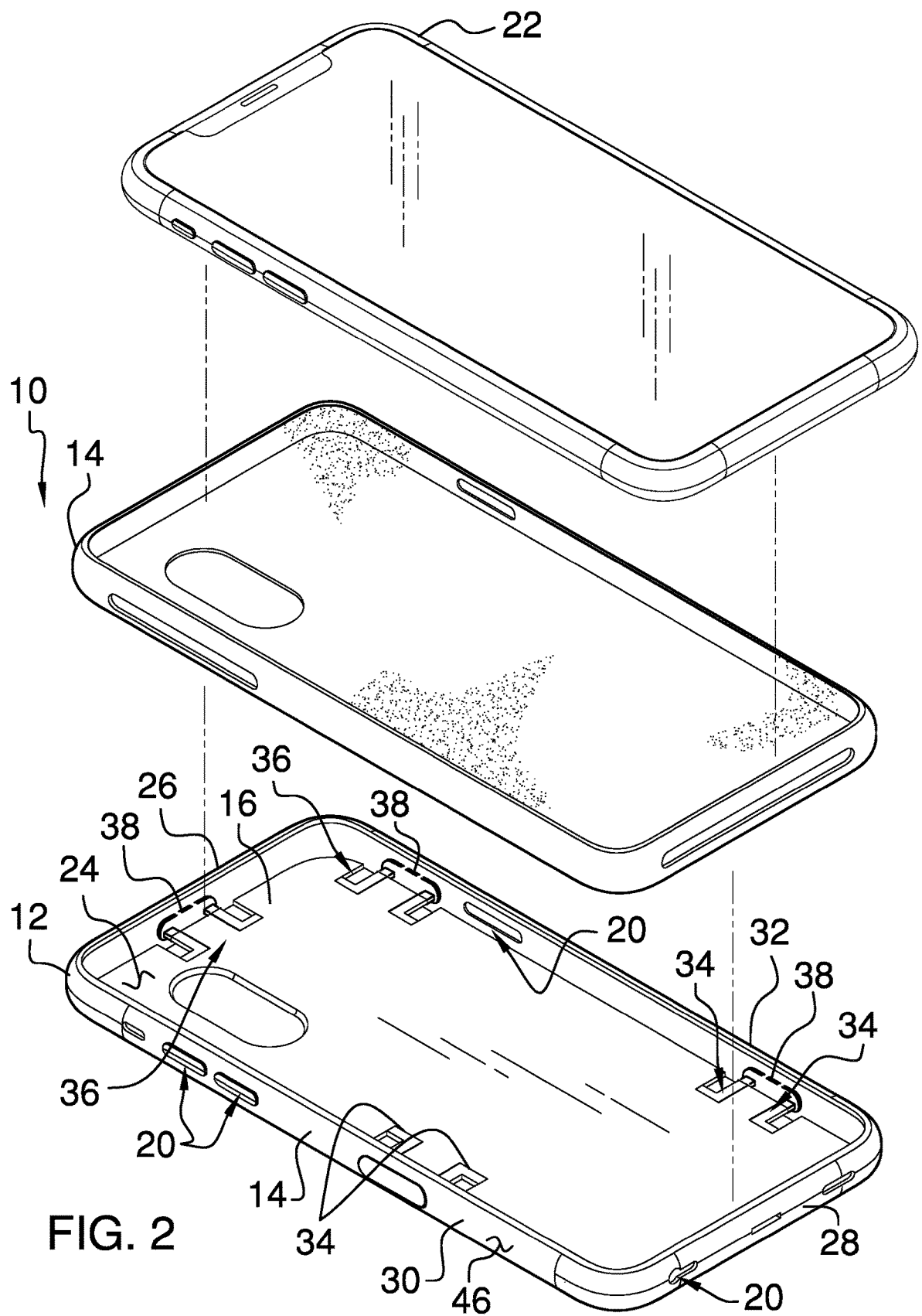
FIG. 2 is an exploded perspective view of an embodiment of the disclosure.
Figure 3:
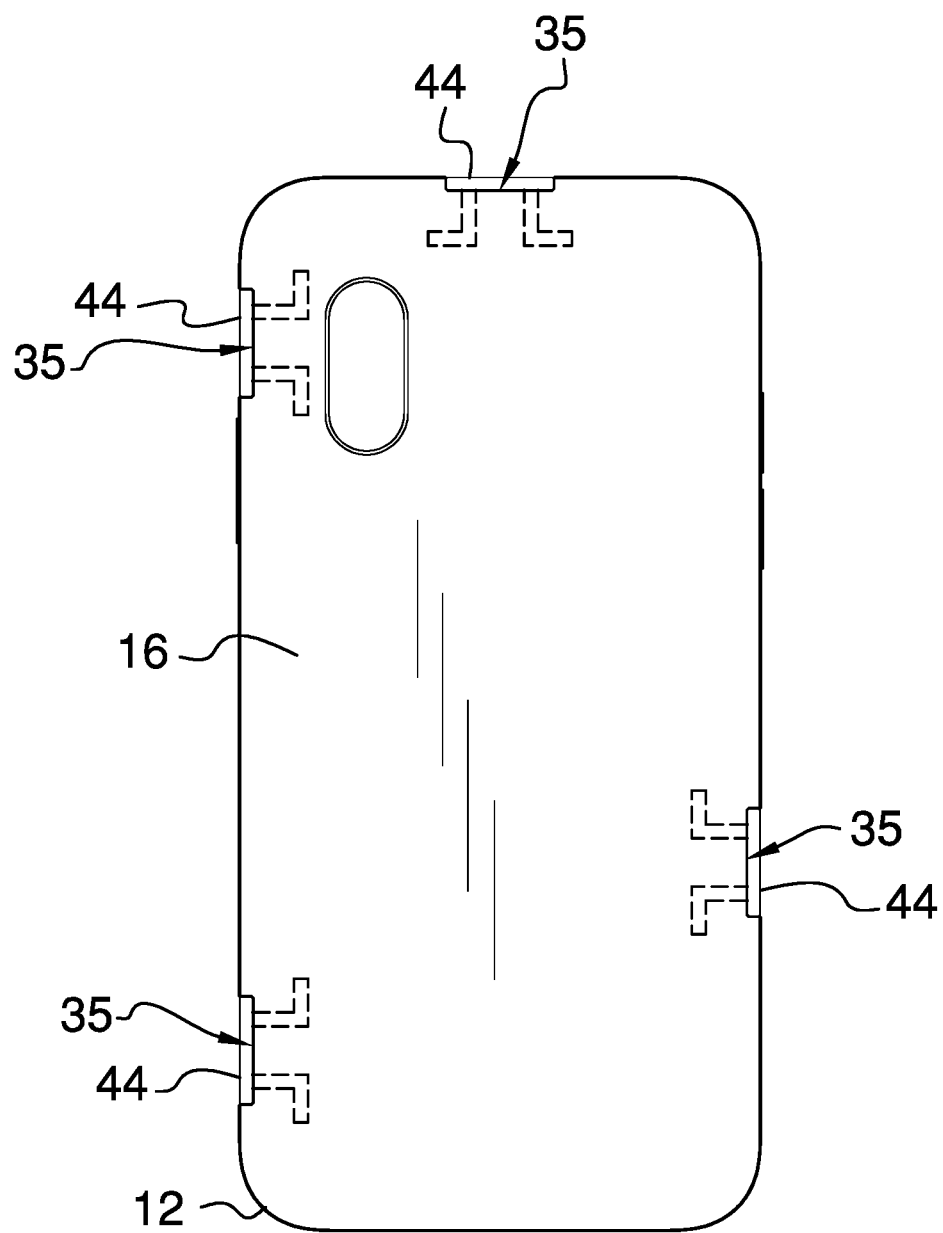
FIG. 3 is a bottom phantom view of an embodiment of the disclosure.
Figure 4:
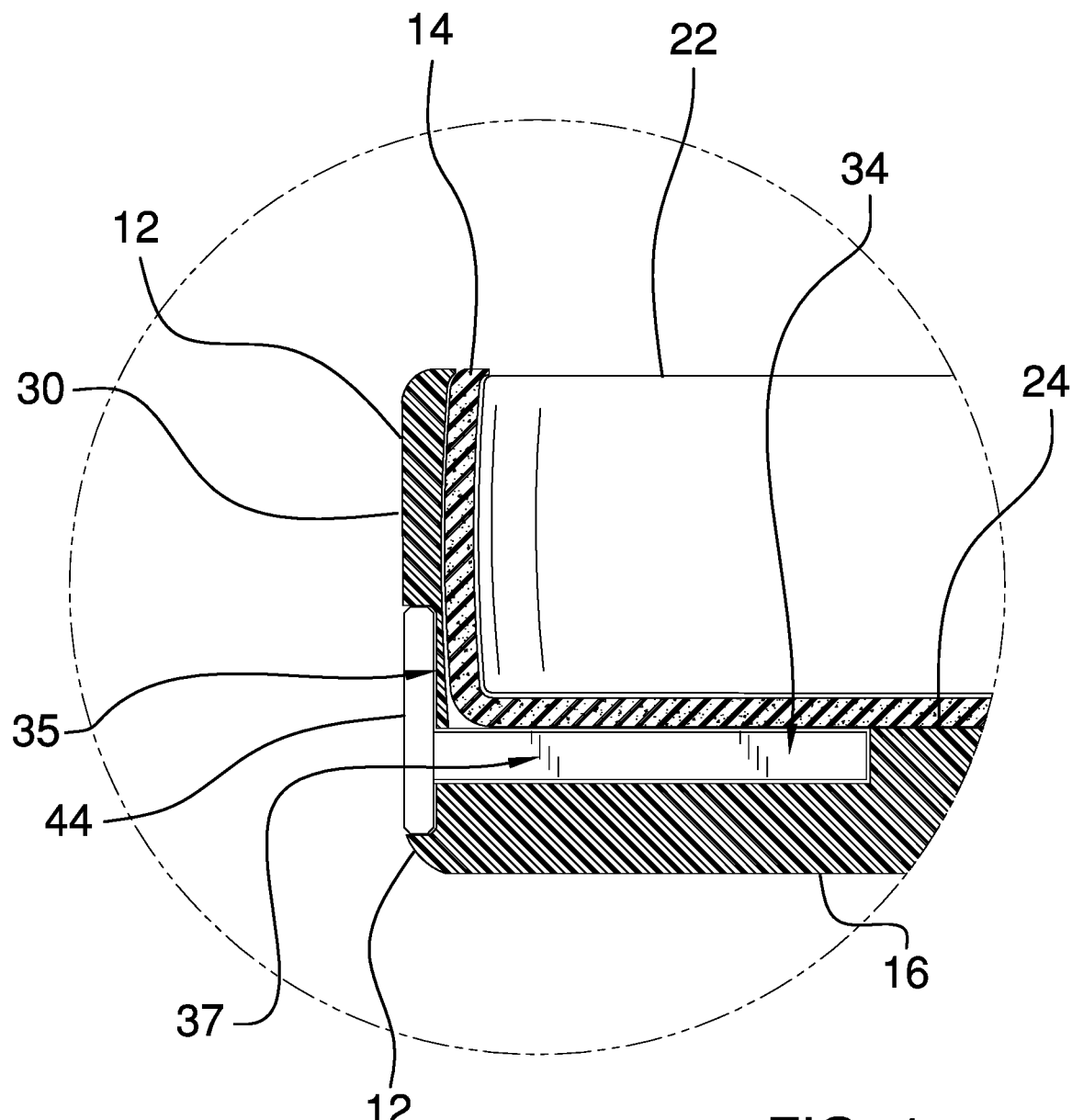
FIG. 4 is a cross sectional view taken along line 4-4 of FIG. 1 of an embodiment of the disclosure.

With reference now to the drawings, and in particular to FIGS. 1 through 7 thereof, a new carrying device embodying the principles and concepts of an embodiment of the disclosure and generally designated by the reference numeral 10 will be described.

As best illustrated in FIGS. 1 through 7, the smart phone carrying assembly 10 generally comprises a shell 12 that is positionable around a smart phone case 14. The smart phone case 14 may be a smart phone case of any conventional size or design, and the shell 12 may be constructed to conform to the smart phone case 14. The shell 12 has a bottom wall 16 and a perimeter wall 18 extending upwardly therefrom, and the perimeter wall 18 has a plurality of access openings 20 each extending through the perimeter wall 18. The plurality of access openings 20 is strategically positioned around the perimeter wall 18 to align with respective openings 20 in the smart phone case 14. In this way the plurality of access openings 20 facilitates controls buttons on a smart phone 22 to be manipulated.

The bottom wall 16 has a top surface 24, and the perimeter wall 18 has a front side 26, a back side 28, a first lateral side 30 and a second lateral side 32. The top surface 24 of the bottom wall 16 has a plurality of channels 34 each extending downwardly therein and each of the plurality of channels 34 intersects the perimeter wall 18 at a perpendicular angle. The plurality of channels 34 is arranged into a plurality of pair of channels 36 and each of the channels 34 in the pair of channels 36 is spaced apart from each other. Moreover, the plurality of the pairs of channels 36 are distributed around the front side 26, the back side 28, the first lateral side 30 and the second lateral side 32 of the perimeter wall 18. The perimeter wall 18 has a plurality of openings 37 extending therethrough, each of the openings 37 is aligned with a respective one of the channels 34 and each of the openings 37 has a width that is less than the width of the respective channel 34. The perimeter wall 18 has a plurality of wells 35 extending inwardly therein and each of the wells 35 is aligned with a respective pair of the channels 36.

A plurality of engagements 38 is provided and each of the engagements 38 is slidably coupled to the shell 12. Each of the engagements 38 is independently positionable in an extended position having the engagements 38 extending outwardly from the shell 12. In this way a respective one of engagements 38 can be coupled to a suspension line 40 for suspending the smart phone from an article of clothing. Each of the engagements 38 is independently positionable in a retracted position having the engagements 38 being recessed into the shell 12.

Each of the engagements 38 includes a pair of legs 42 and a member 44 extending between each of the legs 42. Each of the legs 42 slidably extends through a respective one of the openings 37 in the perimeter wall 18 and is positioned in a respective one of the channels 34 in a respective one of the pairs of channels 36 in the top surface 24 of the bottom wall 16. The member 44 of each of the engagements 38 is recessed into a respective one of the wells 35 when the engagements 38 are positioned in the retracted position. Conversely, the member 44 of each of the engagements 38 is spaced from the outer surface 46 of the perimeter wall 18 when the engagements 38 are positioned in the extended position. Each of the legs 42 has a foot 48 thereon extending in opposite directions from each other. As is most clearly shown in FIG. 6, each of the feet 48 abuts the perimeter wall 18 of the shell 12 when the associated engagement 38 is positioned in the extended position. In this way the feet 48 inhibits the associated engagement 38 from being removed from the respective pair of channels 36.

Figure 5:
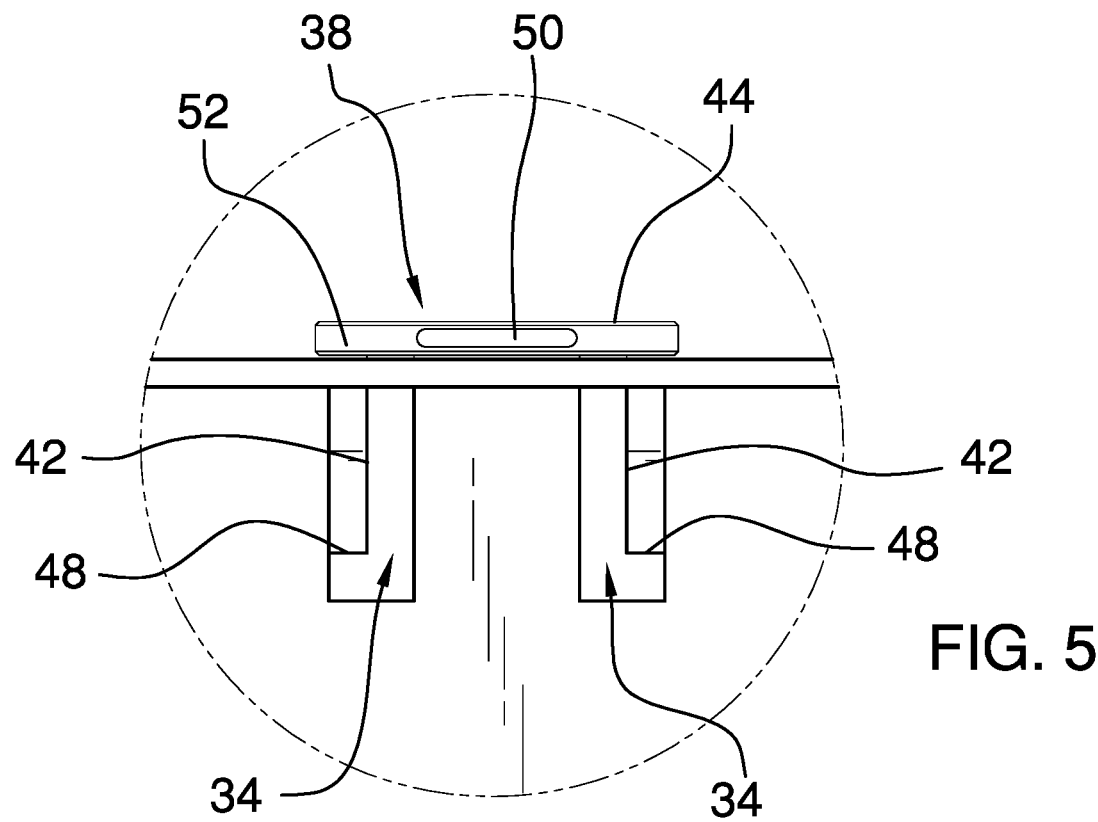
FIG. 5 is a top view of an alternative embodiment of the disclosure showing an engagement in a retracted position.
Figure 6:
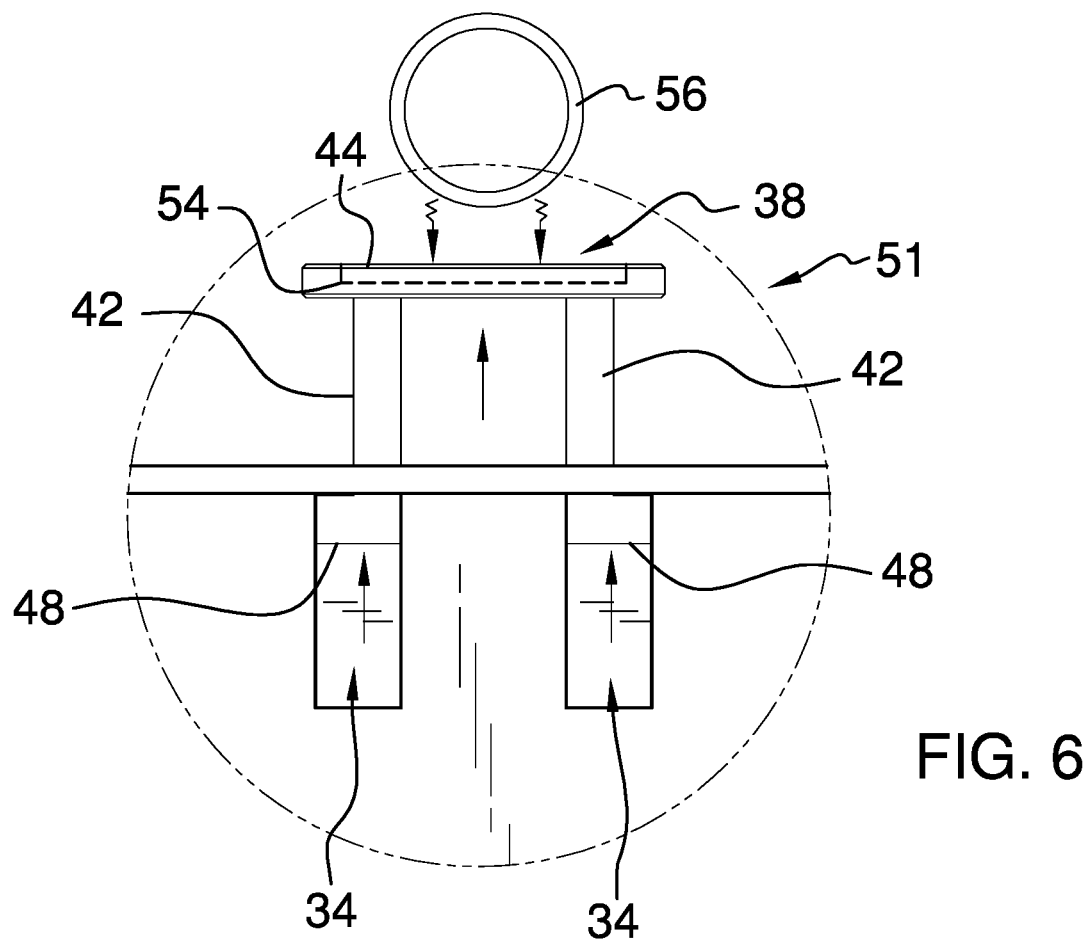
FIG. 6 is a top view of an alternative embodiment of the disclosure showing an engagement in an extended position.
Figure 7:
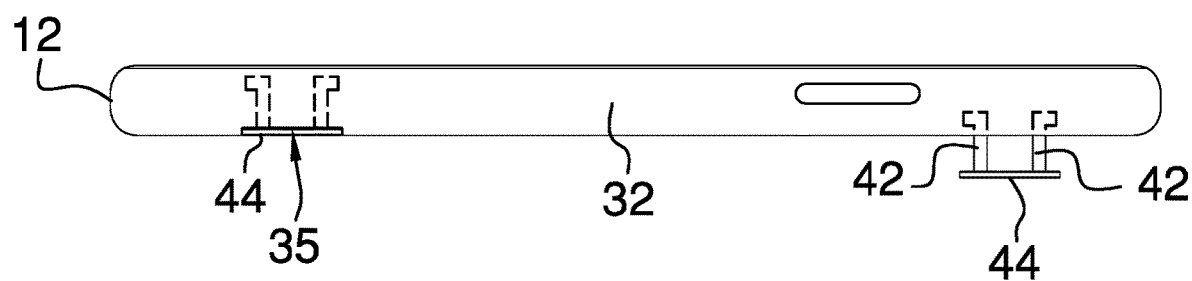
FIG. 7 is a perspective phantom view of an embodiment of the disclosure.

In an alternative embodiment 49 as is most clearly shown in FIG. 5, the member 44 of each of the engagements 38 has a slot 50 extending downwardly into a top side 52 of the member 44. The slot 50 can be engaged by a user's fingernail for urging the engagements 38 into the extended position. Moreover, the slot 50 is exposed when the engagements 38 are in the retracted position to facilitate the user to engage the slot 50 in a selected one of the engagements 38. In an alternative embodiment 51 as is most clearly shown in FIG. 6, each of the engagements 38 includes a ferromagnetic element 54 that is integrated into the member 44. Continuing in the alternative embodiment 51 as shown in FIG. 6, a ring 56 is provided that is worn on a finger of the user and the ring 56 is comprised of a magnetic material. The ring 56 may be provided in various sizes for accommodating different finger sizes. The ring 56 is positionable against the member 44 of a respective one of the engagements 38 thereby facilitating the ring 56 to magnetically engage the ferromagnetic element 54. In this way the respective engagement 38 can be urged into the extended position.

In use, the shell 12 is positioned around the smart phone case 14 and a selected one of the engagements 38 is slid into the extended position. As is most clearly shown in FIG. 1, this facilitates the selected engagement 38 to be coupled to a lanyard for suspending the smart phone 22 from an article of clothing, such as a belt loop on a pair of pants. In this way a smart phone case 14 that does not have the capacity to be coupled to a lanyard can be suspended from the article of clothing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smart phone carrying assembly for suspending a smart phone from a chain, said assembly comprising:
 a shell that is positionable around a smart phone case;
 a plurality of engagements, each of said engagements being slidably coupled to said shell, each of said engagements being independently positionable in an extended position having said engagements extending outwardly from said shell wherein a respective one of engagements is configured to be coupled to a suspension line for suspending the smart phone from an article of clothing, each of said engagements being independently positionable in a retracted position having said engagements being recessed into said shell; and
 wherein said shell has a bottom wall and a perimeter wall, said bottom wall having a top surface, said perimeter wall having a front side, a back side, a first lateral side and a second lateral side, said top surface of said bottom wall having a plurality of channels each extending downwardly therein, each of said plurality of channels intersecting said perimeter wall at a perpendicular angle, said plurality of channels being arranged into a plurality of pair of channels.

2. The assembly according to claim 1, wherein said shell has a bottom wall and a perimeter wall extending upwardly therefrom, said perimeter wall having a plurality of access openings each extending through said perimeter wall, said plurality of access openings being strategically positioned around said perimeter wall to align with respective openings in the smart phone case wherein said plurality of access openings is configured to facilitate controls buttons on a smart phone to be manipulated.

3. The assembly according to claim 1, wherein each of said channels in each of said pair of channels is spaced apart from each other, said plurality of pairs of said channels being distributed around said front side, said back side, said first lateral side and said second lateral side of said perimeter wall.

4. The assembly according to claim 3, further comprising a plurality of wells each being recessed into said perimeter wall, each of said wells being aligned with a respective pair of said channels.

5. The assembly according to claim 4, wherein each of said engagements includes a pair of legs and a member extending between each of said legs, each of said legs slidably extending through said perimeter wall and being positioned in a respective one of said channels in a respective one of said pairs of channels in said top surface of said bottom wall.

6. The assembly according to claim 5, wherein said member of each of said engagements is recessed into a respective one of said wells in said perimeter wall when said engagements are in said retracted position, said member of each of said engagements being spaced from said outer surface of said perimeter wall when said engagements are positioned in said extended position.

7. A smart phone carrying assembly for suspending a smart phone from a chain, said assembly comprising:

a shell that is positionable around a smart phone case, said shell having a bottom wall and a perimeter wall extending upwardly therefrom, said perimeter wall having a plurality of access openings each extending through said perimeter wall, said plurality of access openings being strategically positioned around said perimeter wall to align with respective openings in the smart phone case wherein said plurality of access openings is configured to facilitate controls buttons on a smart phone to be manipulated, said bottom wall having a top surface, said perimeter wall having a front side, a back side, a first lateral side and a second lateral side, said top surface of said bottom wall having a plurality of channels each extending downwardly therein, each of said plurality of channels intersecting said perimeter wall at a perpendicular angle, said plurality of channels being arranged into a plurality of pair of channels, each of said channels in said pair of channels being spaced apart from each other, said plurality of said pairs of channels being distributed around said front side, said back side, said first lateral side and said second lateral side of said perimeter wall, said perimeter wall having a plurality of wells each being recessed into said perimeter wall, each of said wells being aligned with a respective pair of said channels; and a plurality of engagements, each of said engagements being slidably coupled to said shell, each of said engagements being independently positionable in an extended position having said engagements extending outwardly from said shell wherein a respective one of engagements is configured to be coupled to a suspension line for suspending the smart phone from an article of clothing, each of said engagements being independently positionable in a retracted position having said engagements being recessed into said shell, each of said engagements including a pair of legs and a member extending between each of said legs, each of said legs slidably extending through said perimeter wall and being positioned in a respective one of said channels in a respective one of said pairs of channels in said top surface of said bottom wall, said member of each of said engagements being recess into a respective one of said wells in said perimeter wall of said shell when said engagements are in said retracted position, said member of each of said engagements being spaced from said outer surface of said perimeter wall when said engagements are positioned in said extended position.

8. The assembly according to claim 7, wherein said member of each of said engagements has a slot extending downwardly into a top side of said member wherein said slot is configured to be engaged by a user's fingernail for urging said engagements into said extended position, said slot being exposed when said engagements are in said retracted position.

9. The assembly according to claim 7, wherein each of said engagements includes a ferromagnetic element being integrated into said member, said member being flush with said outer surface of said perimeter wall when said engagements are in said retracted position.

10. The assembly according to claim 9, further comprising a ring being configured to be worn on a finger of the user, said ring being comprised of a magnetic material, said ring being positionable against said member of a respective one of said engagements thereby facilitating said ring to magnetically engage said ferromagnetic element for urging said respective engagement into said extended position.

* * * * *